US009930233B2

United States Patent
Singh et al.

(10) Patent No.: US 9,930,233 B2
(45) Date of Patent: Mar. 27, 2018

(54) FILTER MOUNTING METHODS AND APPARATUS AND RELATED CAMERA APPARATUS

(71) Applicant: THE LIGHTCO INC., Palo Alto, CA (US)

(72) Inventors: Harpuneet Singh, Dublin, CA (US); James Schmieder, Wayland, NY (US)

(73) Assignee: Light Labs Inc., Palo Alto, CA (US)

( * ) Notice: Subject to any disclaimer, the term of this patent is extended or adjusted under 35 U.S.C. 154(b) by 0 days.

(21) Appl. No.: 15/136,860

(22) Filed: Apr. 22, 2016

(65) Prior Publication Data

US 2016/0316117 A1 Oct. 27, 2016

Related U.S. Application Data

(60) Provisional application No. 62/151,403, filed on Apr. 22, 2015.

(51) Int. Cl.
*H04N 5/225* (2006.01)
*G03B 17/00* (2006.01)

(52) U.S. Cl.
CPC ......... *H04N 5/2254* (2013.01); *H04N 5/2253* (2013.01)

(58) Field of Classification Search
CPC ..... H04N 5/2254; H04N 5/2253; G03B 17/00
(Continued)

(56) References Cited

U.S. PATENT DOCUMENTS

| 4,890,133 | A | 12/1989 | Ogawa et al. |
| 5,078,479 | A | 1/1992 | Vuilleumier |
| 5,153,569 | A | 10/1992 | Kawamuraa et al. |
| 5,353,068 | A | 10/1994 | Moriwake |
| 5,583,602 | A | 12/1996 | Yamamoto |
| 5,781,331 | A | 7/1998 | Carr et al. |
| 5,889,553 | A | 3/1999 | Kino et al. |
| 5,975,710 | A | 11/1999 | Luster |
| 5,982,951 | A | 11/1999 | Katayama et al. |

(Continued)

FOREIGN PATENT DOCUMENTS

| EP | 2642757 A2 | 9/2013 |
| JP | 10091765 | 4/1998 |

(Continued)

OTHER PUBLICATIONS

Notification of Transmittal of the International Search Report and the Written Opinion of the International Searching Authority, or the Declaration, International Search Report and Written Opinion of the International Searching Authority from International Application No. PCT/US2016/029064, pp. 1-10, dated Aug. 25, 2016.

(Continued)

*Primary Examiner* — Tuan Ho
*Assistant Examiner* — Marly Camargo
(74) *Attorney, Agent, or Firm* — Straub & Straub; Michael P. Straub; Stephen T. Straub

(57) ABSTRACT

Methods and apparatus, for mounting and using a filter over an image sensor are described as well as camera modules and apparatus incorporating the filter mount. Also described is a sensor and filter assembly which can be formed by combining the sensor, filter, filter mount, and a mounting board which can be shipped and integrated into a camera module and/or camera. A filter is placed in a filter well of a filter mount. By using a well to support the filter over a sensor, the top of the filter can be level or below the top of sidewalls of the filter mount. Use of a well to mount the filter reduces the risk of stray or unintentionally reflected light reaching the sensor and degrading captured images while protecting the filter from downward pressure or sideways contact.

18 Claims, 10 Drawing Sheets

(58) Field of Classification Search
USPC .......... 348/340, 342, 24.1, 290, 374, 224.1;
438/64, 65, 70; 396/275
See application file for complete search history.

(56) References Cited

U.S. PATENT DOCUMENTS

| | | |
|---|---|---|
| 6,011,661 A | 1/2000 | Weng |
| 6,028,600 A | 2/2000 | Rosin et al. |
| 6,081,670 A | 6/2000 | Madsen et al. |
| 6,141,034 A | 10/2000 | McCutchen |
| 7,009,652 B1 | 3/2006 | Tanida et al. |
| 7,280,735 B2 | 10/2007 | Thibault |
| 7,315,423 B2 | 1/2008 | Sato |
| 7,551,358 B2 | 6/2009 | Lee et al. |
| 7,561,201 B2 | 7/2009 | Hong |
| 7,801,428 B2 | 9/2010 | Nagaishi et al. |
| 7,810,511 B2 | 10/2010 | Fagrenius et al. |
| 8,144,230 B2 | 3/2012 | Watanabe et al. |
| 8,194,169 B2 | 6/2012 | Tamaki et al. |
| 8,199,222 B2 | 6/2012 | Drimbarean et al. |
| 8,237,841 B2 | 8/2012 | Tanida et al. |
| 8,320,051 B2 | 11/2012 | Matsumura et al. |
| 8,417,058 B2 | 4/2013 | Tardif |
| 8,482,637 B2 | 7/2013 | Ohara et al. |
| 8,520,022 B1 | 8/2013 | Cohen et al. |
| 8,553,106 B2 | 10/2013 | Scarff |
| 8,619,082 B1 | 12/2013 | Cuirea et al. |
| 8,639,296 B2 | 1/2014 | Ahn et al. |
| 8,665,341 B2 | 3/2014 | Georgiev et al. |
| 8,704,944 B1 | 4/2014 | Wierzoch et al. |
| 8,762,895 B2 | 6/2014 | Mehta et al. |
| 8,780,258 B2 | 7/2014 | Lee |
| 8,896,655 B2 | 11/2014 | Mauchly et al. |
| 9,041,826 B2 | 5/2015 | Jung et al. |
| 9,104,705 B2 | 8/2015 | Fujinaga |
| 9,135,732 B2 | 9/2015 | Winn et al. |
| 9,282,228 B2 | 3/2016 | Laroia |
| 9,374,514 B2 | 6/2016 | Laroia |
| 2002/0149691 A1 | 10/2002 | Pereira et al. |
| 2003/0018427 A1 | 1/2003 | Yakota et al. |
| 2003/0020814 A1 | 1/2003 | Ono |
| 2003/0185551 A1 | 10/2003 | Chen |
| 2004/0100479 A1 | 5/2004 | Nakano et al. |
| 2004/0227839 A1 | 11/2004 | Stavely et al. |
| 2005/0088546 A1 | 4/2005 | Wang |
| 2005/0200012 A1 | 9/2005 | Kinsman |
| 2006/0067672 A1 | 3/2006 | Washisu et al. |
| 2006/0187338 A1 | 8/2006 | May et al. |
| 2006/0221218 A1 | 10/2006 | Alder et al. |
| 2006/0238886 A1 | 10/2006 | Kushida et al. |
| 2006/0281453 A1 | 12/2006 | Jaiswal et al. |
| 2007/0050139 A1 | 3/2007 | Sidman |
| 2007/0065012 A1 | 3/2007 | Yamakado et al. |
| 2007/0127915 A1 | 6/2007 | Lu et al. |
| 2007/0177047 A1 | 8/2007 | Goto |
| 2007/0182528 A1 | 8/2007 | Breed et al. |
| 2008/0030592 A1 | 2/2008 | Border et al. |
| 2008/0074755 A1 | 3/2008 | Smith |
| 2008/0084484 A1 | 4/2008 | Ochi et al. |
| 2008/0111881 A1 | 5/2008 | Gibbs et al. |
| 2008/0180562 A1 | 7/2008 | Kobayashi |
| 2008/0211941 A1 | 9/2008 | Deever et al. |
| 2008/0219654 A1 | 9/2008 | Border et al. |
| 2008/0240698 A1 | 10/2008 | Bartilson et al. |
| 2008/0247745 A1 | 10/2008 | Nilsson |
| 2008/0251697 A1 | 10/2008 | Park et al. |
| 2008/0278610 A1 | 11/2008 | Boettiger |
| 2009/0086032 A1 | 4/2009 | Li |
| 2009/0136223 A1 | 5/2009 | Motomura et al. |
| 2009/0154821 A1 | 6/2009 | Sorek et al. |
| 2009/0225203 A1 | 9/2009 | Tanida et al. |
| 2009/0278950 A1 | 11/2009 | Deng et al. |
| 2009/0290042 A1 | 11/2009 | Shiohara |
| 2010/0013906 A1 | 1/2010 | Border et al. |
| 2010/0034531 A1 | 2/2010 | Go |
| 2010/0045774 A1 | 2/2010 | Len et al. |
| 2010/0053414 A1 | 3/2010 | Tamaki et al. |
| 2010/0079635 A1 | 4/2010 | Yano et al. |
| 2010/0091089 A1 | 4/2010 | Cromwell et al. |
| 2010/0097443 A1 | 4/2010 | Lablans |
| 2010/0225755 A1 | 9/2010 | Tamaki et al. |
| 2010/0238327 A1 | 9/2010 | Griffith et al. |
| 2010/0265346 A1 | 10/2010 | Iizuka |
| 2010/0296802 A1 | 11/2010 | Davies |
| 2011/0051243 A1 | 3/2011 | Su |
| 2011/0063325 A1 | 3/2011 | Saunders |
| 2011/0069189 A1 | 3/2011 | Venkataraman et al. |
| 2011/0080655 A1 | 4/2011 | Mori |
| 2011/0123115 A1 | 5/2011 | Lee et al. |
| 2011/0128393 A1 | 6/2011 | Tavi et al. |
| 2011/0157430 A1 | 6/2011 | Hosoya et al. |
| 2011/0157451 A1 | 6/2011 | Chang |
| 2011/0187878 A1 | 8/2011 | Mor et al. |
| 2011/0193984 A1 | 8/2011 | Kitaya et al. |
| 2011/0221920 A1 | 9/2011 | Gwak |
| 2011/0222167 A1 | 9/2011 | Iwasawa |
| 2011/0242342 A1 | 10/2011 | Goma et al. |
| 2011/0280565 A1 | 11/2011 | Chapman et al. |
| 2011/0285895 A1 | 11/2011 | Weng et al. |
| 2012/0002096 A1 | 1/2012 | Choi et al. |
| 2012/0033069 A1 | 2/2012 | Becker et al. |
| 2012/0062691 A1 | 3/2012 | Fowler et al. |
| 2012/0155848 A1 | 6/2012 | Labowicz et al. |
| 2012/0162464 A1 | 6/2012 | Kim |
| 2012/0188391 A1 | 7/2012 | Smith |
| 2012/0027462 A1 | 8/2012 | Justice |
| 2012/0242881 A1 | 9/2012 | Suzuki |
| 2012/0249815 A1 | 10/2012 | Bohn et al. |
| 2012/0257013 A1 | 10/2012 | Witt et al. |
| 2012/0257077 A1 | 10/2012 | Suzuki |
| 2012/0268642 A1 | 10/2012 | Kawai |
| 2013/0027353 A1 | 1/2013 | Hyun |
| 2013/0050564 A1 | 2/2013 | Adams, Jr. et al. |
| 2013/0057743 A1 | 3/2013 | Minagawa et al. |
| 2013/0064531 A1 | 3/2013 | Pillman et al. |
| 2013/0076928 A1 | 3/2013 | Olsen et al. |
| 2013/0086765 A1 | 4/2013 | Chen |
| 2013/0088614 A1 | 4/2013 | Lee |
| 2013/0093842 A1 | 4/2013 | Yahata |
| 2013/0093947 A1 | 4/2013 | Lee et al. |
| 2013/0100272 A1 | 4/2013 | Price et al. |
| 2013/0153772 A1 | 6/2013 | Rossi et al. |
| 2013/0155194 A1 | 6/2013 | Sacre et al. |
| 2013/0194475 A1 | 8/2013 | Okamoto |
| 2013/0222676 A1 | 8/2013 | Ono |
| 2013/0223759 A1 | 8/2013 | Nishiyama |
| 2013/0250125 A1 | 9/2013 | Garrow et al. |
| 2013/0258044 A1 | 10/2013 | Betts-Lacroix |
| 2014/0049677 A1 | 2/2014 | Kawaguchi |
| 2014/0063018 A1 | 3/2014 | Takeshita |
| 2014/0111650 A1 | 4/2014 | Georgiev et al. |
| 2014/0152802 A1 | 6/2014 | Olsson et al. |
| 2014/0192214 A1 | 7/2014 | Laroia |
| 2014/0192224 A1 | 7/2014 | Laroia |
| 2014/0192225 A1 | 7/2014 | Laroia |
| 2014/0192240 A1 | 7/2014 | Laroia |
| 2014/0192253 A1 | 7/2014 | Laroia |
| 2014/0204244 A1 | 7/2014 | Choi et al. |
| 2014/0226041 A1 | 8/2014 | Eguchi et al. |
| 2014/0267243 A1 | 9/2014 | Venkataraman et al. |
| 2014/0293079 A1 | 10/2014 | Milanfar et al. |
| 2014/0354714 A1 | 12/2014 | Hirschler et al. |
| 2015/0035824 A1 | 2/2015 | Takahashi et al. |
| 2015/0043808 A1 | 2/2015 | Takahashi et al. |
| 2015/0049233 A1 | 2/2015 | Choi |
| 2015/0154449 A1 | 6/2015 | Ito et al. |
| 2015/0156399 A1 | 6/2015 | Chen et al. |
| 2015/0234149 A1 | 8/2015 | Kreitzer et al. |
| 2015/0253647 A1 | 9/2015 | Mercado |

(56) References Cited

U.S. PATENT DOCUMENTS

2015/0279012 A1   10/2015   Brown et al.
2016/0142610 A1   5/2016    Rivard et al.

FOREIGN PATENT DOCUMENTS

| JP | 2001061109    | 3/2001  |
| JP | 2007164258    | 6/2004  |
| JP | 2004289214    | 10/2004 |
| JP | 2006106230    | 4/2006  |
| JP | 2007201915    | 8/2007  |
| JP | 2008268937    | 11/2008 |
| JP | 2010049263    | 3/2010  |
| JP | 2010256397    | 11/2010 |
| KR | 100153873     | 7/1998  |
| KR | 1020080022260 | 3/2008  |
| KR | 1020110022279 | 3/2011  |
| KR | 1020130038076 | 4/2013  |

OTHER PUBLICATIONS

Segan, S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.

Robertson, M et al "Dynamic Range Improvement Through Multiple Exposures". 1999. [online] [retrieved on Apr. 16, 2014]:<URL:http://ieeexplore.ieee.org/xpl/login.jsp?tp=&arnumber=817091&url=http%3A%2F%2Fieeexplore.ieee.org%2Fxpls%2Fabs_all.jsp%3Farnumber%3D817091>, pp. 1-6.

FILTER MOUNTING METHODS AND APPARATUS AND RELATED CAMERA APPARATUS

RELATED APPLICATIONS

The present application claims the benefit of U.S. Provisional Application Ser. No. 62/151,403 filed Apr. 22, 2015 which is hereby expressly incorporated by reference in its entirety.

FIELD

The present application relates to filter mounting methods and apparatus, camera apparatus including a filter mount and camera devices including filter mounts.

BACKGROUND

Camera modules normally each include a sensor. In order to shield a sensor intended to capture visible images from the effects of light which is not to be captured by the sensor, e.g., infrared light in the case of a sensor to be used to capture visual images, a sensor is often covered by a filter. Positioning of a filter over a sensor can present various mounting issues.

While an approach to mounting an IR filter over an image sensor is shown in FIG. 1. FIG. 1 shows a filter sensor assembly 1000 which includes an IR filter 1002 which is placed above and glued to supports 1004, 1006. The supports 1004, 1004' are secured to mounting board 1008 on which the sensor 1003 is mounted. Wires 1006, 1006' connect the sensor to electrical contacts, e.g., on the mounting board 1008.

While the IR filter mounting arrangement shown in FIG. 1 is simple to construct, it has several disadvantages. The IR filter 1002, because it sits on top of the support walls 1004, 1004', is subject to the risk of being scratched or crushed during shipment since it is the top most element of the assembly 1000. Furthermore light passing through the filter may bounce off one of the wires 1006 and 1006' and be reflected onto the active area of the sensor 1008 since the sidewalls are vertical and the area over the wires 1006 is exposed to light which can be reflected onto the sensor 1003. In additional light may pass through the side of the IR filter and be reflected or otherwise reach the sensor since the sidewalls of the IR filter 1002 are exposed.

In addition to the above problems the assembly may suffer from issues relating to the use of glue between the bottom of the IR filter and the top of the supports 1004, 1004' to secure the IR filter to the supports. Glue placed on top of the supports 1004, 1004' may tend to ooze out when the filter 1002 is placed over the supports potentially seeping onto the sensor and/or inner surface of the IF filter and potentially interfering with light passing through the filter onto the sensor. In addition, a fair amount of glue may be needed to prevent the IR filter being shifted sideways during shipment since the sides of the IR filter may be subject to sideways forces since they are exposed on top of the supports 1004, 1004'.

In view of the above, it should be appreciated that there is a need for improved methods and apparatus for mounting a filter over an image sensor and/or for implementing a system including a filter and sensor. While it is not necessary that all embodiments address all of the problems noted above with the filter mounting arrangement shown in FIG. 1, it would be desirable if a filter mounting arrangement and/or filter and sensor assembly could be developed which would address one or more of the above discussed problems.

SUMMARY

Methods and apparatus, for mounting and using a filter, e.g., an IR filter, over an image sensor are described as well as camera modules and apparatus incorporating the filter mount. Also described is a sensor and filter assembly which can be formed by combining the sensor, filter, filter mount, and a mounting board which can be shipped and integrated into a camera module and/or camera.

In accordance with one aspect, a filter, e.g., IR filter, is placed in a filter well of a filter mount. By using a well to support the filter over a sensor, the top of the filter can be level or below the top of sidewalls of the filter mount. This decreases the risk of damage to the filter from downward pressure or sideways contact which could be a problem if the filter were secured on top of a filter support rather than in a well. In addition use of a well to mount the filter reduces the risk of stray or unintentionally reflected light reaching the sensor and degrading captured images.

In some embodiments the filter well includes notches in the corners where glue can be used to secure the filter in the well. The notches server to reduce the potential for stress cracks and also provide an area where the glue can flow or expand outward without causing problems with the filter glued in place.

The sidewalls of the filter well protect the filter from lateral forces allowing a smaller amount of glue to be used to secure the filter than if the filter was not placed in a filter well with protecting sidewall. Without a well with protecting sidewalls, the filter might, during shipment, be exposed and subjected to sideways pressure or contact across the top of the filter that might tend to shift the filter.

The corner notches provide an area where excess glue can ooze out to the side without contaminating the filter surface where light is to pass to reach the sensor located below the filter secured in the filter well. In some embodiments, sidewalls of the filter support structure which extend up to the bottom of the filter well are tapered rather than being directly vertical. This sidewall tapering reduces the risk of light rays being reflected off the inner sidewalls of the filter support and onto the light sensitive area of the sensor located beneath the filter.

Furthermore by having a portion of the filter mount extend out over the wires which connect the sensor to the mounting board the risk of light being reflected off the wires and onto the sensor is reduced.

The filter support and sensor may be, and in some embodiments are, secured to mounting board, e.g., printed circuit board, with wires and/or a flexible printed circuit connecting to the sensor and exiting through the rear of the printed circuit board which serves as the mounting board. Corner cut outs in one or more of the corners of the filter mount are left open to allow for out gassing as adhesive used to cure the components together into an assembly is allowed to cure and to allow for pressure equalization between the compartment, formed by the mounting board, filter mount and filter, in which the sensor is located, and outside atmospheric pressure which may change due to changes in altitude, e.g., during shipment or use, or because of weather changes. While one or more corners maybe left open to allow for out gassing and/or to avoid pressure differentials which might occur if the unit was completely sealed the openings, e.g., e.g. vents, are relatively small with little risk of particles reaching and collecting on the sensor surface.

Thus by assembling the filter, mount, sensor and sensor board in a relatively clean environment, the enclosure formed by the mounting board, filter holder and filter tend to protect the sensor from dirt during shipment and subsequent integration into a camera device including one or more optical chains each including a sensor, filter, filter mount and sensor mounting board.

The assembly including the filter, sensor, filter mount and mounting board can be assembled and shipped as a unit for integration into a camera module and/or incorporation into a camera including one or more such assemblies. Since the sensor is protected by the filter, filter mounting board and support board, it can be shipped and integrated into a camera module or camera without having to take clean room type precautions normally used when dealing with an exposed sensor. Furthermore the filter mount and filter provide a rugged structure which is less prone to scratching than other configurations where the filter is placed on top of support walls of a filter mount and left exposed above the level of the support walls. This is particularly the case in embodiments where the filter surface is recessed slightly below the top of the filter mount support walls.

The filter mount and the sensor assembly including the filter mount can be implemented in a relatively thin format allowing for thin camera implementations which can be important given the desire by many customers for thin easy to handle devices.

Numerous benefits and embodiments are discussed in the detailed description which follows.

DETAILED DESCRIPTION

Figure 2:
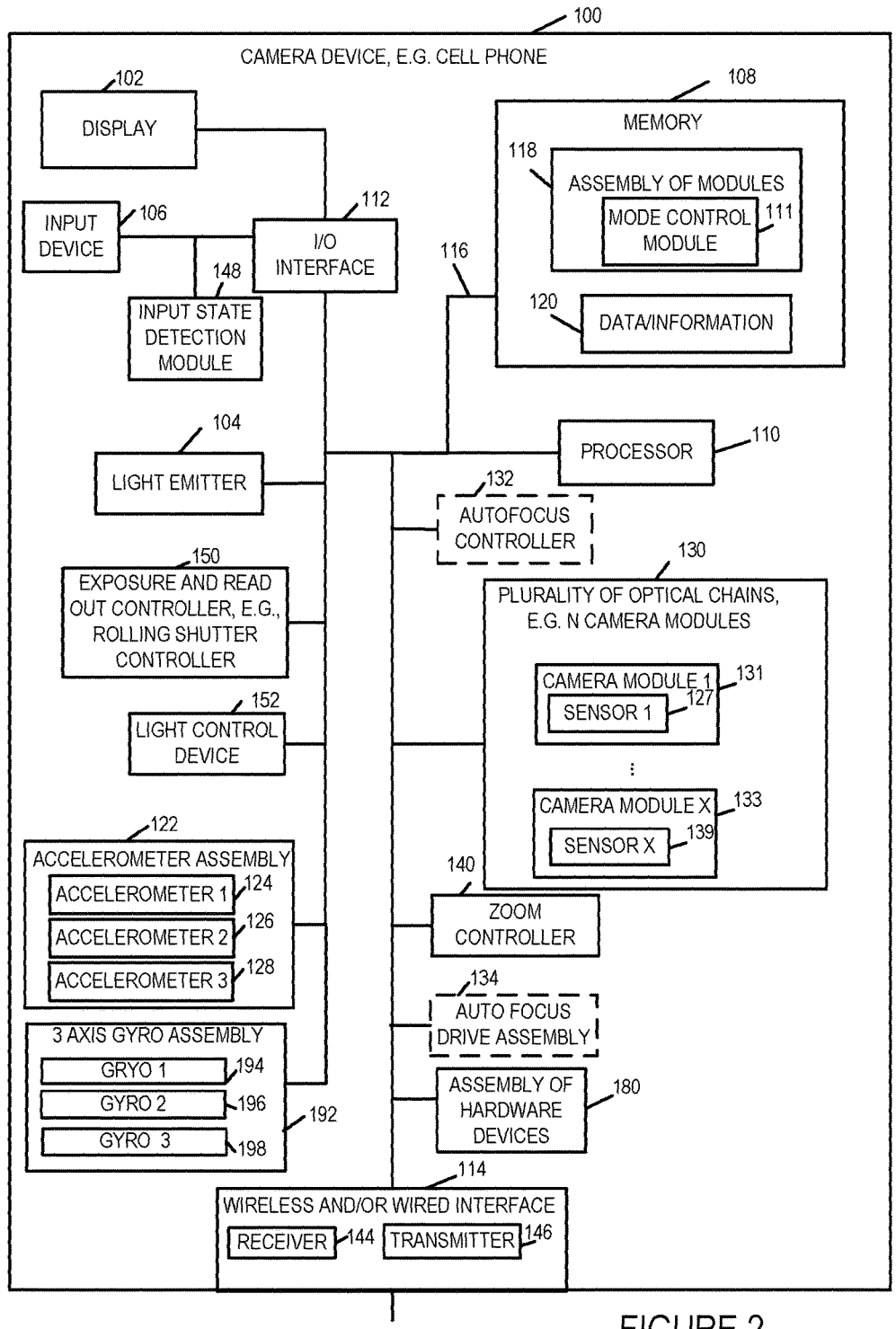
FIG. 2 is a block diagram of an exemplary apparatus, e.g., a camera device, implemented in accordance with one embodiment of the present invention.

FIG. 2 illustrates an exemplary camera device 100 such as a digital camera, notepad with camera functionality, or cell phone with camera functionality, implemented in accordance with one exemplary embodiment of the present invention. The camera device 100, in some embodiments, is a portable device. In other embodiments, the camera device 100 is a fixed device such as a wall mounted camera.

FIG. 2 illustrates the camera device 100 in block diagram form showing the connections between various elements of the apparatus 100. The exemplary camera device 100 includes a display device 102, a light emitter 104, an input device 106, an input state detection module 148, an exposure and readout controller 150, e.g., a rolling shutter controller 150, a light control device 152, memory 108, a processor 110, an assembly of hardware devices 180, a wireless and/or wired interface 114, e.g., a cellular interface, a Wi-Fi interface, and/or a USB interface, an I/O interface 112, an accelerometer assembly 122, 3 axis gyro assembly 192, and a bus 116 which are mounted in a housing represented by the rectangular box touched by the line leading to reference number 100. The light emitter 104 includes light emitting elements which may be LEDs (Light Emitting Diodes) or other types of light emitting elements which can be individually controlled so that all the light emitting elements need not be on at the same time. The input device 106 may be, and in some embodiments is, e.g., keypad, touch screen, or similar device that may be used for inputting information, data and/or instructions. The accelerometer assembly 122 includes accelerometer 1 124, accelerometer 2 126, and accelerometer 3 128 which are arrayed on perpendicular axes providing a 3 axis accelerometer assembly. Thus, the accelerometer assembly 122 can measure along 3 independent axes.

Similarly, the 3-axis gyro assembly 192, which includes gyro 1 194, gyro 2 196 and gyro 198 can measure rotation along each of 3 different axes. The output of the accelerometer assembly 122 and the gyro assembly 192 can, and in some embodiments is, monitored with changes in accelerometer and gyro output being interpreted and checked over time by processor 110 and/or zoom control module, e.g., zoom controller 140, to detect changes in acceleration indicating motion in one or more directions. In some embodiments the input device 106 includes at least one zoom control button that can be used to enable or disable camera zoom functionality. In some such embodiments when the zoom control button is in a depressed state the camera zoom function is enabled while when the button is in a un-depressed state the camera zoom function is disabled. The input state detection module 148 is configured to detect the state of the input device, e.g., the zoom control button, to detect whether the button is in a depressed state or undepressed state. In some embodiments there is a status register in the camera device 100 that includes a bit indicating the state of the zoom control button detected by the state detection module 148, e.g., whether it is in the depressed state indicating that zoom is enabled or whether it is undepressed indicating that zoom is disabled.

The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. As will be discussed in some embodiments zooming operation can be controlled by pressing a zoom control sensor, e.g., a touch sensor. In some embodiments when the camera user touches the zoom control sensor the zoom functionality is enabled. For example a finger on the touch sensor activates/enables the zoom functionality. The I/O interface 112 couples the display 102 and input device 106 to the bus 116 and interfaces between the display 102, input device 106 and the other elements of the camera which can communicate and interact via the bus 116.

Figure 3:
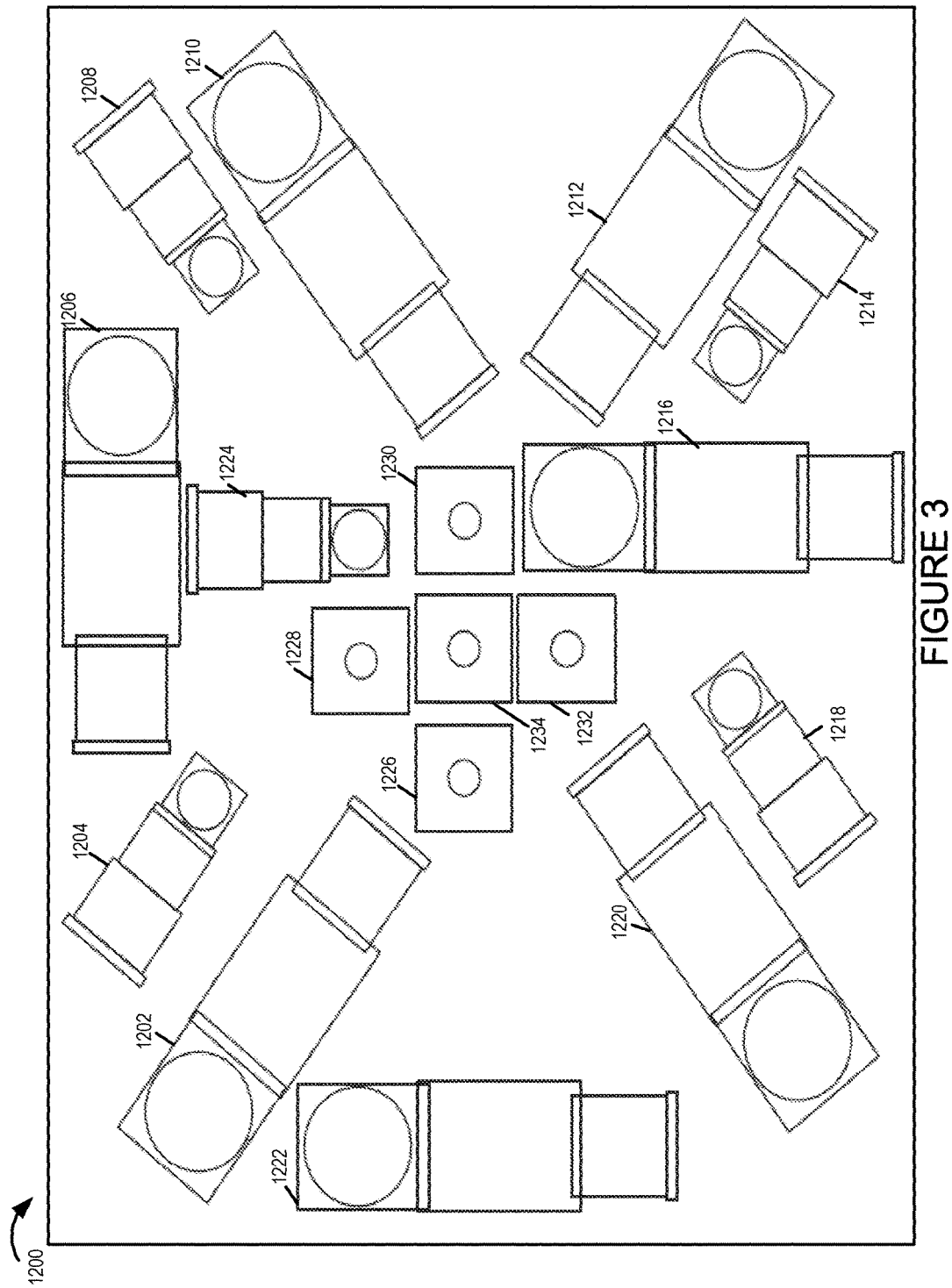
FIG. 3 illustrates an arrangement of optical chains, e.g., camera modules, used in one embodiment to implement a camera device, such as the camera device of FIG. 2, where each optical can and sometimes do include a fitter, sensor and mount of the type shown in one or more of the subsequent figures.

In addition to being coupled to the I/O interface 112, the bus 116 is coupled to the memory 108, processor 110, an optional autofocus controller 132, the wireless and/or wired interface 114, a zoom control module 140, and a plurality of optical chains 130, e.g., X optical chains also referred to herein as camera modules. In some embodiments X is an integer greater than 2, e.g., 3, 4, 7 or a larger value depending on the particular embodiment. The plurality of camera modules 130 may be implemented using any of the various camera module sets and/or arrangements described in the present application. For example, in some embodiments the camera device 100 is implemented using a set of camera modules as shown in FIG. 3 while in other embodiments the camera device 100 may be implemented using other module arrangements. Images captured by individual optical chains in the plurality of optical chains 130 can, and in various embodiments are, stored in memory 108, e.g., as part of the data/information 120 and processed by the processor 110, e.g., to generate one or more composite images.

The X camera modules 131 through 133 may, and in various embodiments do, include camera modules having different focal lengths. Each camera module (camera module 1 131, . . . , camera module X 133) includes an image sensor (sensor 1 127, . . . , sensor X 139), respectively. Multiple camera modules may be provided at a given focal length. For example, multiple camera modules having a 35 mm equivalent focal length to a full frame DSLR camera, multiple camera modules having a 70 mm equivalent focal length to a full frame DSLR camera and multiple camera modules having a 140 mm equivalent focal length to a full frame DSLR camera are included in an individual camera device in some embodiments. The various focal lengths are exemplary and a wide variety of camera modules with different focal lengths may be used. The camera device 100 is to be considered exemplary. To the extent that other references are made to a camera or camera device with regard to some of the other figures, it is to be understood that at least in some embodiments the camera device or camera will include the elements shown in FIG. 2 even if the elements are not shown in a particular figure or embodiment. While in some embodiments all of the elements shown in FIG. 2 are included in the camera device or camera, in other embodiments a subset of the elements shown in FIG. 2 are included and the illustration of the elements in FIG. 2 is not intended to imply that a particular element is essential or necessary in all embodiments.

As will be discussed below images from different camera modules captured at the same time or during a given time period can be combined to generate a composite image, e.g., an image having better resolution, frequency content and/or light range than an individual image captured by a single one of the camera modules 131, 133.

Multiple captured images and/or composite images may, and in some embodiments are, processed to form video, e.g., a series of images corresponding to a period of time. The interface 114 couples the internal components of the camera device 100 to an external network, e.g., the Internet, and/or one or more other devices e.g., a memory device or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108. The light emitter module 104 in some embodiments includes a plurality of light emitting elements, e.g., LEDs, which can be illuminated in a controlled manner to serve as the camera flash with the LEDs being controlled in groups or individually, e.g., in a synchronized manner based on operation of the rolling shutter and/or the exposure time. For purposes of discussion module 104 will be referred to as an LED module since in the exemplary embodiment LEDs are used as the light emitting devices but as discussed above the invention is not limited to LED embodiments and other light emitting sources may be used as well. In some embodiments the LED module 104 includes an array of light emitting elements, e.g., LEDs. In some embodiments the light emitting elements in the LED module 104 are arranged such that each individual LED and/or a group of LEDs can be illuminated in a synchronized manner with rolling shutter operation. Light emitting elements are illuminated, in some but not all embodiments, sequentially, so that different portions of an area are illuminated at different times so that the full area need not be consistently lighted during image capture. While all lighting elements are not kept on for the full duration of an image capture operation involving the reading out of the full set of pixel elements of a sensor, the portion of area which is having its image captured, e.g., the scan area, at a given time as a result of the use of a rolling shutter will be illuminated thanks to synchronization of the lighting of light emitting elements with rolling shutter operation. Thus, various light emitting elements are controlled to illuminate at different times in some embodiments based on the exposure time and which portion of a sensor will be used to capture a portion of an image at a given time. In some embodiments the light emitting elements in the light emitter 104 include a plurality of sets of light emitting elements, each set of light emitting elements corresponding to a different image area which it illuminates and which is captured by a different portion of the image sensor. Lenses may be, and in some embodiments are, used to direct the light from different light emitting elements to different scene areas which will be captured by the camera through the use of one or more camera modules.

The rolling shutter controller 150 is an electronic shutter that controls reading out of different portions of one or more image sensors at different times. Each image sensor is read one row of pixel values at a time and the various rows are read in order. As will be discussed below, the reading out of images captured by different sensors is controlled in some embodiments so that the sensors capture a scene area of interest, also sometimes referred to as an image area of interest, in a synchronized manner with multiple sensors capturing the same image area at the same time in some embodiments.

While an electronic rolling shutter is used in most of the embodiments, a mechanical rolling shutter may be used in some embodiments.

The light control device 152 is configured to control light emitting elements (e.g., included in the light emitter 104) in a synchronized manner with the operation of the rolling shutter controller 150. In some embodiments the light control device 152 is configured to control different sets of light emitting elements in the array to emit light at different times in a manner that is synchronized with the timing of the rolling shutter 150. In some embodiments the light control device 152 is configured to control a first set of light emitting elements corresponding to a first image area to output light during a first time period, the first time period being determined based on the timing of the rolling shutter and being a period of time during which a first portion of the sensor is exposed for image capture. In some embodiments the light control device 152 is further configured to control a second set of light emitting elements corresponding to a second image area to output light during a second time period, the second time period being determined based on the timing of the rolling shutter and being a period of time during which a second portion of the sensor is exposed for image capture. In some embodiments the first time period includes at least a portion of time which does not overlap the second time period.

In some embodiments the light control device 152 is further configured to control an Nth set of light emitting elements corresponding to an Nth image area to output light during a third time period, said Nth time period being determined based on the timing of the rolling shutter and being a period of time during which an Nth portion of the sensor is exposed for image capture, N being an integer value corresponding to the total number of time periods used by said rolling shutter to complete one full read out of total image area.

In some embodiments the light control device 152 is further configured to control the second set of light emitting elements to be off during said portion of time included in the first period of time which does not overlap said second period of time. In some embodiments the light control device is configured to determine when the first set and said second set of light emitting elements are to be on based on an exposure setting. In some embodiments the light control device is configured to determine when said first set and said second set of light emitting elements are to be on based on an amount of time between read outs of different portions of said sensor. In some embodiments the different sets of light emitting elements in the plurality of light emitting elements are covered with different lenses. In some such embodiments the light control device 152 is further configured to determine which sets of light emitting elements to use based on an effective focal length setting being used by the camera device.

The accelerometer assembly 122 includes a plurality of accelerometers including accelerometer 1 124, accelerometer 2 126, and accelerometer 3 128. Each of the accelerometers is configured to detect camera acceleration in a given direction. Although three accelerometers 124, 126 and 128 are shown included in the accelerometer assembly 122 it should be appreciated that in some embodiments more than three accelerometers can be used. Similarly the gyro assembly 192 includes 3 gyros, gyro 1 194, gyro 2 196 and gyro 3 198, one for each axis which is well suited for use in the 3 dimensional real world environments in which camera devices are normally used. The camera acceleration detected by an accelerometer in a given direction is monitored. Acceleration and/or changes in acceleration, and rotation indicative of camera motion, are monitored and processed to detect one or more directions, of motion e.g., forward camera motion, backward camera motion, etc. As discussed below, the acceleration/rotation indicative of camera motion can be used to control zoom operations and/or be provided in some cases to a camera mount which can then take actions such as rotating a camera mount or rotating a camera support to help stabilize the camera.

The camera device 100 may include, and in some embodiments does include, an autofocus controller 132 and/or autofocus drive assembly 134. The autofocus drive assembly 134 is, in some embodiments, implemented as a lens drive. The autofocus controller 132 is present in at least some autofocus embodiments but would be omitted in fixed focus embodiments. The autofocus controller 132 controls adjustment of at least one lens position in one or more optical chains used to achieve a desired, e.g., user indicated, focus. In the case where individual drive assemblies are included in each optical chain, the autofocus controller 132 may drive the autofocus drive of various optical chains to focus on the same target.

The zoom control module 140 is configured to perform a zoom operation in response to user input. The processor 110 controls operation of the camera device 100 to control the elements of the camera device 100 to implement the steps of the methods described herein. The processor 110 may be a dedicated processor that is preconfigured to implement the methods of the present invention. However, in many embodiments the processor 110 operates under direction of software modules and/or routines stored in the memory 108 which include instructions that, when executed, cause the processor 110 to control the camera device 100 to implement one, more or all of the methods described herein. Memory 108 includes an assembly of modules 118 wherein one or more modules include one or more software routines, e.g., machine executable instructions, for implementing the image capture, image generation and/or image data processing methods of the present invention. Individual steps and/or lines of code in the modules of 118 when executed by the processor 110 control the processor 110 to perform steps of the method of the invention, e.g., generating depth map, determining maximum expected frequencies and/or filtering image portions, in accordance with the invention. When executed by processor 110, the assembly of modules 118 cause at least some data to be processed by the processor 110 in accordance with the method of the present invention, e.g., filtering image portions in accordance with the invention. The assembly of modules 118 includes a mode control module which determines, e.g., based on user input which of a plurality of camera device modes of operation are to be implemented. In different modes of operation, different camera modules 131, 133 may be, and often are, controlled differently based on the selected mode of operation. For example, depending on the mode of operation different camera modules may use different exposure times. Alternatively, the scene area to which an individual camera module is directed and thus what portion of a scene is captured by the individual camera module may be changed depending on how the images captured by different camera modules are to be used, e.g., combined to form a composite image and what portions of a larger scene individual camera modules are to capture during the user selected or automatically selected mode of operation. In some embodiments, the operations performed by the processor 110 when executing the instructions from one or more assembly of modules of the assembly of modules 118 is instead performed by a hardware device which performs the same functionality and is included in the assembly of hardware devices 180.

The resulting data and information (e.g., captured images of a scene, combined or composite images of a scene, filtered images, etc.) are stored in data/information block 120 for future use, additional processing, and/or output, e.g., to display device 102 for display or to another device for transmission, processing and/or display. In some embodiments the data/information block 120 further includes optical chain information, e.g., optical characteristics, corresponding to the plurality of optical chains 130 in the device 100. If one or more parameters/settings in the optical characteristics of a camera module changes then the corresponding optical chain information stored in the data/information 120 is updated. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

As shown in FIG. 3 seventeen camera modules are used in a single camera device, e.g., camera device 100 of FIG. 2, in some embodiments. Camera devices including even larger numbers of optical chains are also possible.

The use of multiple optical chains has several advantages over the use of a single optical chain. Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

Given the small size of the optical sensors (e.g., individual pixel elements) the dynamic range, in terms of light sensitivity, is normally limited with the sensors becoming easily saturated under bright conditions. By using multiple optical chains corresponding to different exposure times, the dark portions of a scene area can be sensed by the sensor corresponding to the longer exposure time while the light portions of a scene area can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 3 is a diagram 1200 showing how the 17 optical chains, e.g., camera modules, of a camera, e.g., the camera device of FIG. 2, can be arranged within the body of the camera. Each of the camera modules, e.g., optical chains, may include a sensor, filter mount and filter of the type shown in FIG. 5. In one exemplary embodiment, the camera shown in FIG. 3 is camera 100 of FIG. 2 and each of the 17 optical chains shown in FIG. 3 is one of the X camera modules (131, . . . , 133), where X=17. The seven optical chains 1202, 1206, 1210, 1212, 1216 1220, 1222 with the largest lenses and largest supported focal lengths are implemented using optical chains of a first type, e.g., including a mirror. Similarly, the five camera modules 1204, 1208, 1214, 1218, 1224 with the medium diameter lenses and medium supported focal lengths are also implemented using optical chains of the first type. The five optical chains 1226, 1228, 1230, 1232 and 1234 having the smallest diameter outer openings, e.g., light entrance openings, and smallest focal lengths are implemented using optical chains which do not use mirrors and extend straight toward the back of the camera. From the FIG. 3 example which may be considered as a frontal view with the front of the camera housing removed to allow viewing of the camera modules, it can be seen how a larger number of camera modules can be incorporated into a single camera device allowing for the simultaneous and/or synchronized capture of multiple images of the same or different portions of a scene area using a single camera. The camera device can then combine multiple images to generate a composite image having image attributes and/or qualities such as a number of pixels which exceeds that possible using a single one of the camera modules of the camera.

In some embodiments the camera includes a processor (e.g., processor 110) configured to generate a composite image by combining at least a first and a second image. In some embodiments the processor is configured to generate the composite image from first, second, third, fourth, fifth and sixth images. In some embodiments the processor is configured to generate the composite image from the first, second, third, fourth, fifth, sixth and seventh images. In some embodiments the processor is further configured to control storage of the generated composite image in the device memory, e.g., memory 108, and/or output of the composite image on a display, e.g., display 102, and/or transmission of the captured images or the composite image to another device via an interface such as interface 114.

Figure 4:
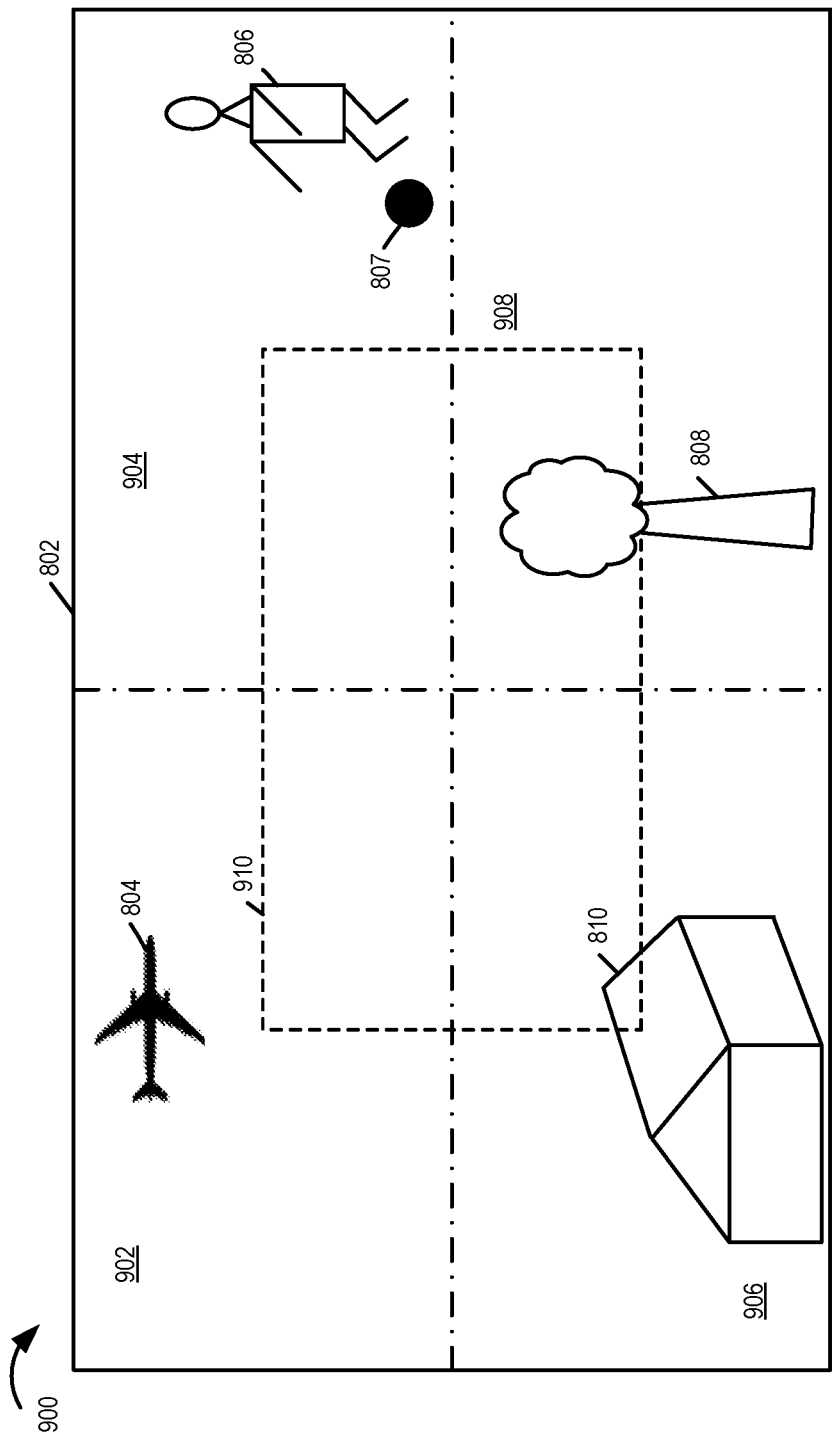
FIG. 4 shows how different camera modules of a camera including multiple camera modules, e.g. optical chains, such as the one shown in FIG. 3 may capture different portions of the scene area of interest.

FIG. 4 is a drawing 900 illustrating an exemplary scene area 802 which may have all or portions of its image captured by camera modules of a camera, e.g., the camera 100, implemented in accordance with one or more embodiments of the invention. Scene area 802 includes multiple objects at least some of which are stationary while others are in motion. In the example, the scene area 802 includes an airplane 804, a person 806, a ball 807, a tree 808 and a house

810. Each of the objects in the scene 802 may have a different corresponding depth in the scene 802. In accordance with one aspect, depth information corresponding to the scene of interest 802 may be generated, e.g., using images corresponding to the portions of scene of interest captured by one or more camera modules and/or by using depth measurement equipment. The generated depth information, e.g., a 3D depth map, includes depths corresponding to the various objects in the scene 802. In the illustrated example, the scene area 802 may be logically partitioned into various scene portions based on various depths in the depth map for the scene of interest 802. In the example consider that there are five different depths in the depth map corresponding to the scene of interest 802.

Drawing 900 of FIG. 4 further illustrates conceptually how different optical chains, e.g., camera modules, of a camera, such as the camera device 100 of FIG. 2 which includes multiple optical chains (as shown in FIG. 3), some of which have different focal lengths can capture different size portions of a scene area 802. The different capture sizes corresponding to the various different camera modules correspond to field of view (FOV) of the respective camera modules in some embodiments.

For purposes of discussion, the capture and combining of images corresponding to different scene areas will be explained using the camera device 100 by referring to FIG. 3 which shows the arrangement of optical chains in camera 100. Consider for purposes of discussion that the camera device 100 includes the 17 modules arranged as shown in FIG. 3. As previously discussed in the FIG. 3 example, three different focal lengths, f1, f2 and f3 are used where f1<f2<f3; f1 is ½ f2; and f2 is ½ f3.

For purposes of discussion the first through seventh camera modules 1202, 1206, 1210, 1212, 1216 1220, 1222, respectively, are the modules with the largest lenses (and thus largest apertures in various embodiments) and largest supported focal lengths (f3). For simplicity in the discussion below, it is further assumed that the distances between the various camera modules is much smaller than the distance between the camera and all the objects in the scene. This is however not a limitation of the described invention but meant only to make the explanation easier to follow.

The five medium sized camera modules which are the eighth through 12th camera modules correspond to reference numbers 1204, 1208, 1214, 1218, 1224, respectively and have medium diameter lenses and medium supported focal lengths (f2).

The five camera modules which are the 13th through 17th camera modules correspond to reference numbers 1226, 1228, 1230, 1232 and 1234 and have the smallest diameter lenses and smallest focal length (f1).

It should be appreciated that the camera modules with the largest focal length f3 will have a relatively smaller field of view in comparison to camera modules with smaller focal lengths and capture smaller portion of a scene area of interest given that they provide the greatest magnification. Assuming that camera modules of the different focal lengths use sensors with the same total pixel count, the modules with the larger focal length (f3) will provide an image with a higher pixel to scene area ratio since more pixels will be used to capture an image of a smaller scene area than will be the case with the medium (f2) and small focal length (f1) camera modules.

It should be appreciated that given the difference in magnification between the modules with different focal lengths (f1, f2, f3) the scene area captured by the small focal length (f1) camera modules will correspond to portion of the scene area of interest which is approximately 16 times the size of the portion the scene area of interest which is captured by the camera modules with the largest (f3) focal length. The portion of the scene area of interest captured by the camera modules with the intermediate focal length (f2) will be 4 times the size of the portion of the scene area of interest captured by the camera modules with the largest focal length (f3) and ¼ the size of the portion of the scene area of interest captured by the camera modules with the smallest focal length (f1).

The relationship between the scene areas captured by camera modules corresponding to the f1 and f2 focal lengths can be appreciated in the context of the FIG. 4 example which shows 7 distinct scene areas. In some embodiments f1=35 mm and f2=70 mm.

In the FIG. 4 example the scene area of interest is identified by reference 802. The scene area 802 corresponds to the full scene area of interest. For purposes of explanation consider that the scene area 802 is captured by optical chains having the focal length f1, i.e., by smaller focal length optical chains. Assume for discussion purposes that (f1) camera module 1228 is used to capture the scene area 802 represented by the largest rectangle in FIG. 4. Note that the actual image captured by 1228 may be of a slightly larger scene area to ensure that the scene area of interest is captured.

Further consider that f2 camera module 1204 is used to capture a second scene area 902 which is represented by the rectangle in the top left corner in FIG. 3, that (f2) camera module 1208 is used to capture a third scene area 904 represented by the rectangle in the top right corner in FIG. 3, that (f2) camera module 1218 is used to capture a fourth scene area 906 represented by the rectangle in the bottom left corner in FIG. 3, that (f2) camera module 1214 is used to capture a fifth scene area 908 represented by the rectangle in the bottom right corner in FIG. 3 and that (f2) camera module 1224 is used to capture sixth scene area 910 represented by the rectangle with dashed lines in the center portion. Again as with the capture of the other scene areas, the actual images captured by the modules 1204, 1208, 1218, 1214 and 1224 may be of slightly larger scene areas to ensure that the respective scene areas are fully contained in the captured images.

Note that the relative position of the outer openings of the camera modules shown in drawing 1200 are known and fixed in some embodiments. However, in some embodiments the modules 1204, 1208, 1218, 1214 and 1224 are the same or similar in their elements and function to a module which includes a mirror that can be driven, e.g., moved or rotated by the hinge (mirror) drive to change the angle of the mirror. While the mirror drive can rotate the mirror around the hinge axis and thus change its angle, the hinge prevents motion in other directions and thus the optical axis (outside the camera) rotates in a plane perpendicular to the axis of the hinge. When the mirror is at a 45 degree angle, the light entering the opening along its optical axis is deflected 90 degrees into the optical axis of Part B of the module, where Part B is the part of the module including optical elements in the light path that are after the light redirection element.

While some modules use a mirror that is movable and hinged, in other embodiments one or more of the camera modules are implemented with a fixed position mirror allowing the moveable hinge and mirror drive to be omitted.

The mirror/hinge drive is controlled by the processor 110 depending on the particular mode of camera operation. Thus, when a user selects a first mode of operation one or more camera modules may have their mirrors at a first angle while during another mode of operation, e.g., a module in which images are to captured and combined, one or more camera modules will have their mirror driven to a different position under control of the processor 110. The particular mode of camera device operation may be determined based on user input by the processor 110 operating under control of the mode control module 111 or directly by the mode control module 111 when the mode control module is implemented in hardware.

If mirrors in each of 1204, 1208, 1218, 1214 and 1224 are at 45 degrees, each module looks directly out of the front face of the camera and their optical axes are all parallel. In this case each of the modules will take an image of the same scene area, e.g., the scene area 910 of FIG. 4. To capture an image of the second scene area with module 1204, the hinged mirror of module 1204 is adjusted so that the optical axis of camera module 1204 points towards the center of the second scene area 906. Note that the module 1204 is positioned in the camera 1200 in such a manner that as the mirror is rotated/moved relative around the hinge, the location in the scene area of interest 802 that the optical axis points to moves along the diagonals of the rectangle 802. Similarly, the mirror for camera module 1214 is adjusted to capture the fifth scene area. Note that in FIG. 3, camera modules 1204, 1214 are arranged proximate, e.g., along or adjacent, one diagonal while camera modules 1208, 1218 are located proximate, e.g., along or adjacent, the other diagonal. Rotating the mirror in 1214, e.g., changing the angle and thus incline of the mirror, makes the module's optical axis move along the corresponding diagonal. Mirrors of modules 1208 and 1218 are similarly angled, e.g., rotated, to capture images of the other scene areas respectively. The module 1224 used to capture the sixth image area 910 points at the center of the scene area of interest 802 so its mirror is maintained at 45 degrees.

It should be appreciated from the above discussion that some camera modules arranged along diagonals. These modules have the Part B of their optical axis parallel to one of the two diagonals. Thus, the arrangement of modules 1210, 1220, 1202, 1212 with the largest apertures along diagonals and also the arrangement of medium aperture modules 1204, 1214, 1208, 1218 along the same diagonals but offset from the other modules for space reasons, is an intentional design choice because it facilitates image capture and combining in some embodiments and modes of operation.

Based on the overlapping scene areas, e.g., 910 and 904 a depth map is generated, e.g., by the processor included in the camera in some embodiments. In some embodiments the depth of an object in the scene can be determined by examining the relative positions of an object in the images captured by different modules. In at least some embodiments the depth map is used, e.g., in combination with information about the relative position of the outer opening of the different optical chains and/or optical axis of the optical chains in combining images captured by the different optical chains to form a composite image.

In the FIG. 4 example, 6 distinct scene areas are shown for purposes of explaining the invention. Each of the 6 scene areas may be, and in some embodiments is, captured by a different optical chain of the camera device 100 prior to being combined.

It should be appreciated that by combining images corresponding to the different scene area portions shown in FIG. 4 to generate a composite image, it is possible to generate a composite image with four times the pixel count of a single image sensor. For example, if each of the image portions is captured by a camera module using an 8 mega pixel sensor, the composite image corresponding to the scene area of interest shown in FIG. 4 would have an overall pixel count of 32 megapixels since the second, third, fourth and fifth scene area would each be captured by a different 8 megapixel sensor and thus contribute 8 megapixels to the composite image. The actual resolution could be slightly lower if the captured images are slightly larger than the corresponding scene areas.

FIG. 4 and the image portions, e.g., the scene areas, shown therein will be used in explaining how rolling shutters corresponding to different camera modules can be controlled in a coordinated manner to facilitate combining of images captured by different camera modules in a way that reduces or minimizes motion related (camera or subject related) distortions that may be introduced if each of the camera module sensors were independently (asynchronously) operated to capture the image portions. The read out from the sensors of the camera modules in a coordinated manner helps in minimizing distortions due to uncoordinated asynchronous image capturing by different optical chains and the captured images can be combined easily.

The above discussed image capture operations performed by various sensors included in corresponding optical chains as discussed above may, and in some embodiments is, performed by a camera such as camera 100 including optical chains arranged as illustrated in FIG. 3.

Figure 5:
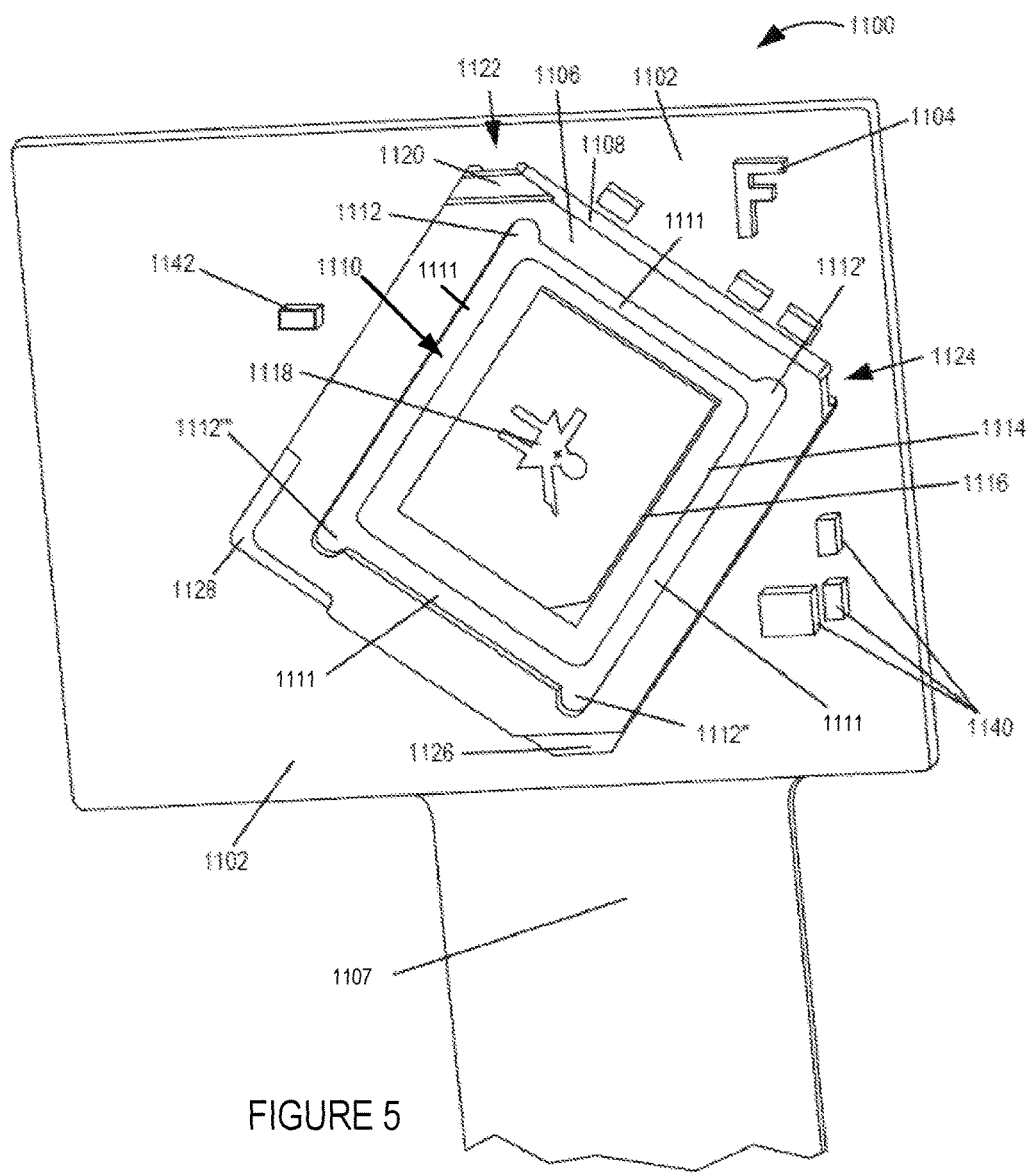
FIG. 5 is a first top perspective view of an assembly including a filter holder, e.g., filter mount, implemented in accordance with one exemplary embodiment that can be used in the camera modules of a camera device such as the one shown in FIG. 2 or any of the other figures of the present application.

FIG. 5 is a first top perspective view of an assembly 1100 including a filter mount, e.g., holder, 1106 implemented in accordance with one exemplary embodiment, which is secured to a mounting board 1102 through which a flexible printed circuit (FPC) 1107 makes electrical contact with an image sensor 1307 (see FIG. 6) secured to the mounting board 1102 and over which the filter mount 1106 is positioned. A filter 1114, e.g., IR filter, is shown in a filter well generally indicated by reference 1110 with the filter 1114 sitting on a support ledge 1111. While the invention will be explained with reference to an IR filter it should be appreciated that other filters maybe mounted in the filter mount 1106 instead, e.g., a color filter, and thus an IR filter is merely exemplary. The filter 1114 may have a thin flat rectangular shape.

The IR filter 1114, in some embodiments has a thickness slightly less than the depth of the filter well 1110. In the FIG. 5 example the IR filter 1114 has slightly rounded corner edges to reduce the potential for stress at the corners and thus reduce the potential for stress cracks radiating from the corner of the IR filter 1114. Since the IF filter is slightly thinner than the filter well 1110 is deep in some embodiments, should a flat object be placed on the top of the filter well it will not contact the surface of the IR filter 1114 and the wait of the object will be supported by the sidewalls 1309, 1309' of the filter well. Inner sidewalls 1306, 1306' (see FIG. 7) extend outward from the outer sidewalls 1309, 1309' to form a support ledge 1111. While the inner sidewalls 1309, 1309' extend inward to from the support ledge 1311 as they extend upward they are tapered so that the top portion of the inner sidewalls is located further out over the sensor than the bottom portion of the inner sidewall 1309, 1309'.

Thus while the filter 1114 maybe the same as or similar to the IR filter 1002, but of a size and shape that to fit in the filter well 1110, in some embodiments the IR filter 1114 is thinner than IR filters mounted on top of support walls and exposed to loads. This is because the IR filter 1114 need not be designed to support direct loads which will be supported by the top of the filter support walls instead of by the filter surface particularly in embodiments where the IF filter 1114 is thinner than the well in which the filter 1114 is mounted is deep.

Since the sides of the IR filter 1114 are blocked by the sidewalls 1309, 1309' of the filter well 1110, the chance of light entering through the side of the IF filter 1114 and being directed down towards the sensor 1307 located beneath the IR filter 1114 by internal reflections and/or a direct light path is reduced or avoided.

In some embodiments the filter well 1110 includes round corner notches 1112, 1112', 1112" and 1112'''. Such rounded corners reduce or avoid potential stress points that might occur if the corners came to a sharp right angle. The rounded corners also provide an area into which a drop of glue used to secure the IR filter 1114 to the filter support can spread or expand without reaching the area over the active area of the sensor 1307. The center area 1116 of the IR filter 1114 shown in FIG. 5 represents the active area of a sensor 1307 positioned beneath the IR filter 1114. FIG. 1118 represents an image of a scene, e.g., person, which may be captured by the image sensor 1307 located beneath the filter 1114. Orientation marker F 1104 is included on the mounting board 1102 and can facilitate an appreciation of the different views of the assembly which can be seen in FIGS. 6 through 9. Electrical components 1140 and 1142 are shown mounted to the printed circuit board 1102 along with the filter holder 1106. Depending on the embodiment the top surface of the IR filter 1114 is level with or slightly below the top surface 1106 of the filter holder 1106.

In the FIG. 5 embodiment the filter mount 1106 includes two notched corners 1122, 1124 which allow for out gassing, e.g., of glue fumes, and/or pressure equalization between the cavity 1357 and the exterior environment. The cavity 1357 is formed by the inside of the filter mount housing 1106 which encloses the sensor 1307 that is secured to the printed circuit board which is used as a mounting board to support the filter holder 1106 and the sensor 1307 mounted beneath the filter holder 1106 on the top side of the mounting board 1102.

One or more corners of the filter holder 1106 may be stepped as indicated by reference numbers 1128, 1120 and 1126 corresponding to different corners. Corner 1126 is intentionally left open to allow for venting of a cavity 1357 formed by the filter 1114, filter mount 1106 and mounting board 1102. The sensor 1307 is mounted in the cavity 1357. While vented at one or more corners, the vent area is relatively small minimizing the risk of dust or dirt entering the otherwise sealed cavity 1357 in which the sensor 1307 is mounted, e.g., on the surface 1103 of mounting board 1102.

The steps on the various corners of the filter holder 1106 can be used to facilitate holding of the filter holder 1106 in a mounting rig during assembly of the components shown in FIG. 5 and/or for other purposes, e.g., to avoid other components which may be included in a camera module into which the assembly shown in FIG. 5 is to be integrated. Depending on the camera module into which the assembly shown in FIG. 5 is to be incorporated, the sensor 1307 and filter holder 1106 may be positioned with a bottom edge parallel to a bottom edge of the mounting board 1102 or offset at an angle as shown in FIG. 5.

The assembly shown in FIG. 5 can be constructed and shipped as a unit for integration into a camera module and/or other camera device. By securing the sensor 1307 to the printed circuit board and covering it with the filter and filter holder 1106 prior to shipment as an assembly for integration into a camera, the sensor 1307 surface can be protected from dust and scratches during shipment and subsequent integration of the assembly including the sensor 1307 into a camera. The FPC 1107 can be used to connect the sensor 1307 output to a processor capable of processing and/or storing images.

The filter holder 1106 may be, and in some embodiments is, glued to the circuit board 1102 with the image sensor 1307 also being glued or soldered to the board 1102. The rounded corners 1112, 1112', 1112" and 1112''' provide convenient glue positions where a drop of glue can be placed prior to insertion of the filter 1114 into the filter well 1110. Excess glue can ooze out into the rounder corner recesses without risk of the glue contaminating the bottom surface of the filter area corresponding to the active region of the image sensor 1307. Since the sidewalls of the filter holder 1309, 1309' protect the filter 1114 from lateral forces that might be placed on the filter if it was not surrounded on the sides by the sidewalls 1309 of the filter well, the filter 1114 need not be secured around all its edge surfaces and gluing in the corners is sufficient for many embodiments. However, in highly shock resistant embodiments the filter may be glued around its full perimeter. The rounding of the corner notches 1112, 1112' and/or corners of the filter 1114 reduces the risk that the corners of the filter 1114 will be subject to stress which can be important since corners are areas from which cracks tend to originate given that they are often prone to stress.

Figure 10:
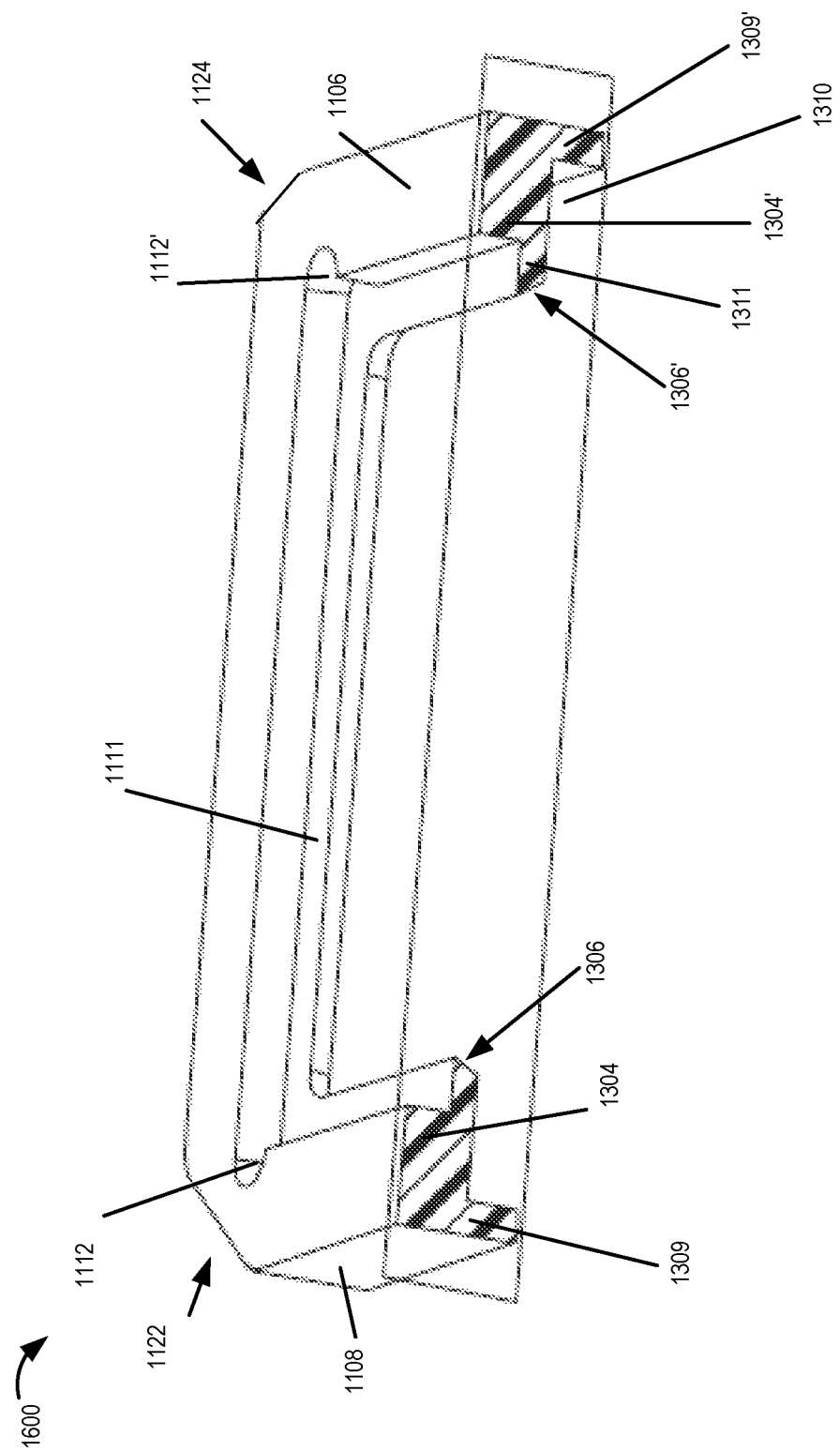
FIG. 10 shows a cross section of an exemplary filter mount, e.g., holder, which is the same or similar to the filter mount of the assembly shown in FIG. 5.

FIG. 10 shows a cross section of the assembly of FIG. 5. In the FIG. 10 cross section it can be seen that the internal sidewalls 1306, 1306' are tapered and angle inward as the inside sidewalls 1306, 1306' extend upward from the area in contact with or just above the top of the image sensor 1307 to a support surface 1311 formed by the top of the sidewalls 1306, 1306' which support the filter 1114. The taper reduces the risk of reflections from the sidewall onto the active area of the sensor as compared to embodiments where vertical inner sidewalls might be used for the portion of the filter mount below the mount and above the sensor 1307. In FIG. 10, gap 1310 shows the open space surrounding image sensor 1307 in which wires are located and secured to contacts on the image sensor 1307. Filter mount 1106 sidewall cross sections 1304, 1304' show the shape of the sidewall of the filter holder 1106 including the outer support portions 1309 and 1309' as well as the inner support walls 1306 and 1306' as they extend out from the support wall portions 1309, 1309' of the filter mount to form a support ledge 1111 of the filter well 1110. The filter well 1110 is above the sensor 1307 and provides an area in which the IR filter is mounted. During shipment and use the IR filter, filter mount 1106 and circuit board form a protective cavity which houses the sensor 1307 and protects it from damage from dust and possible damage from infrared light (IR) during shipment and use.

Figure 6:
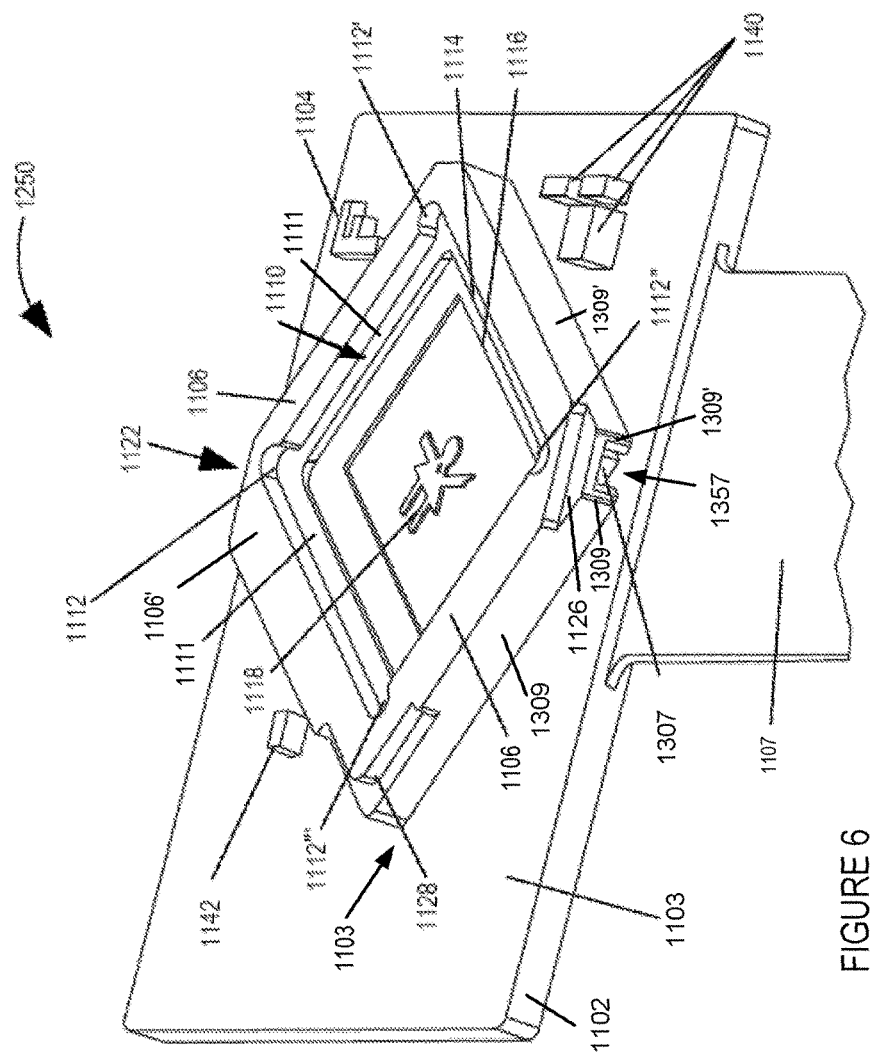
FIG. 6 shows the exemplary assembly of FIG. 5 from one perspective and/or with a cross sections being shown.
Figure 7:
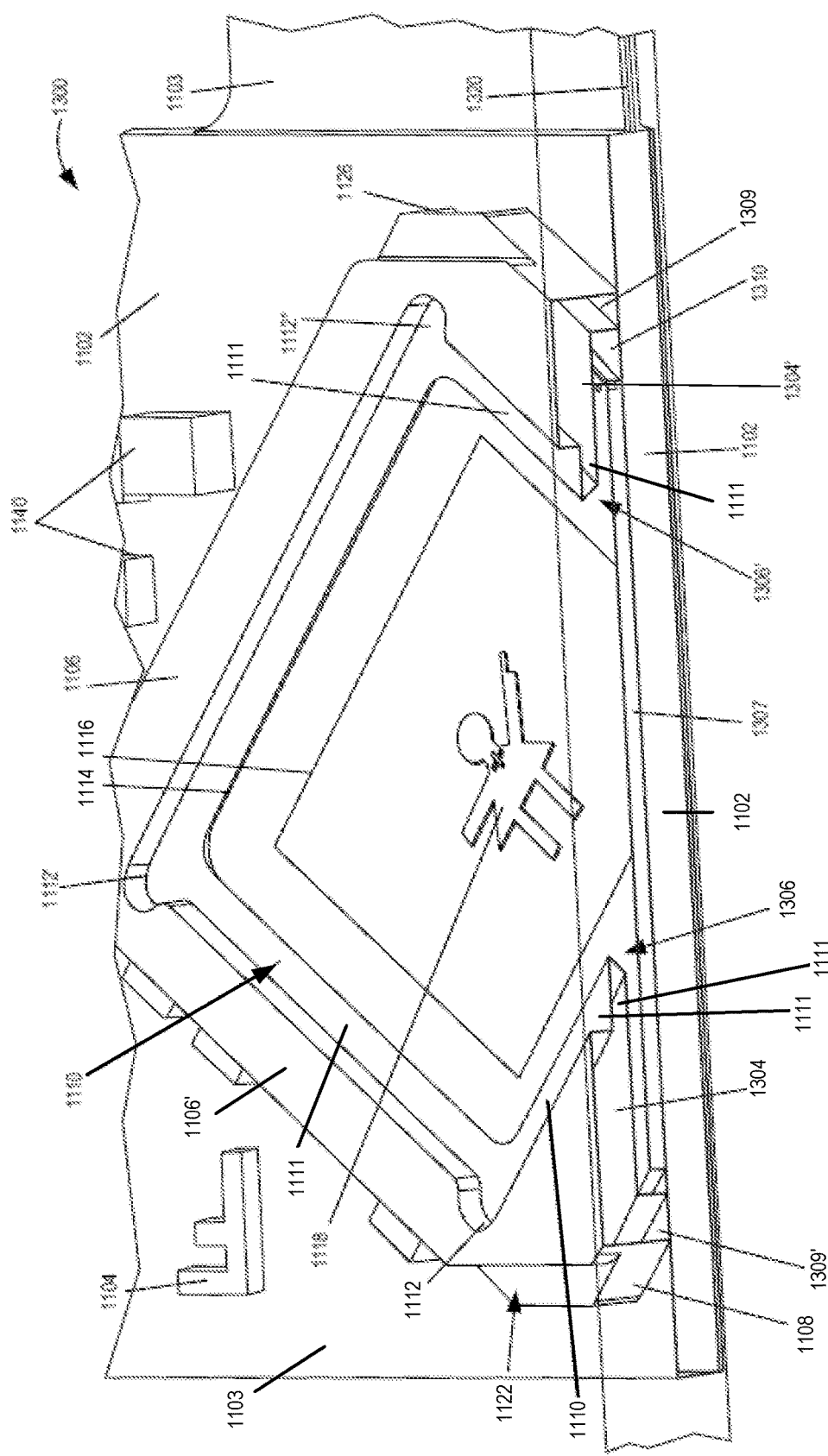
FIG. 7 shows the exemplary assembly of FIG. 5 from another perspective and/or with a different cross sections being shown.
Figure 8:
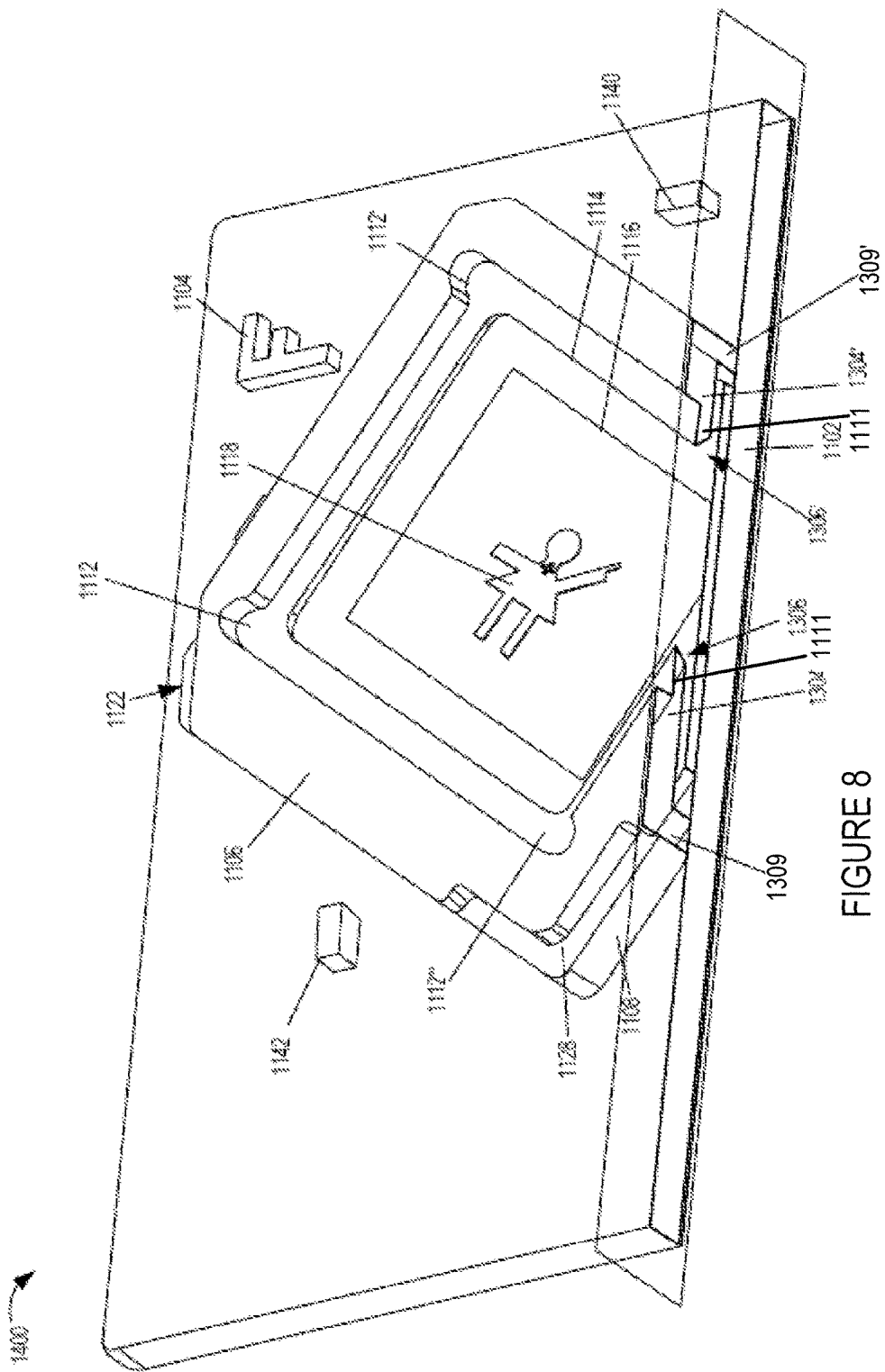
FIG. 8 shows the exemplary assembly of FIG. 5 from yet another perspective and/or with a different cross sections being shown.
Figure 9:
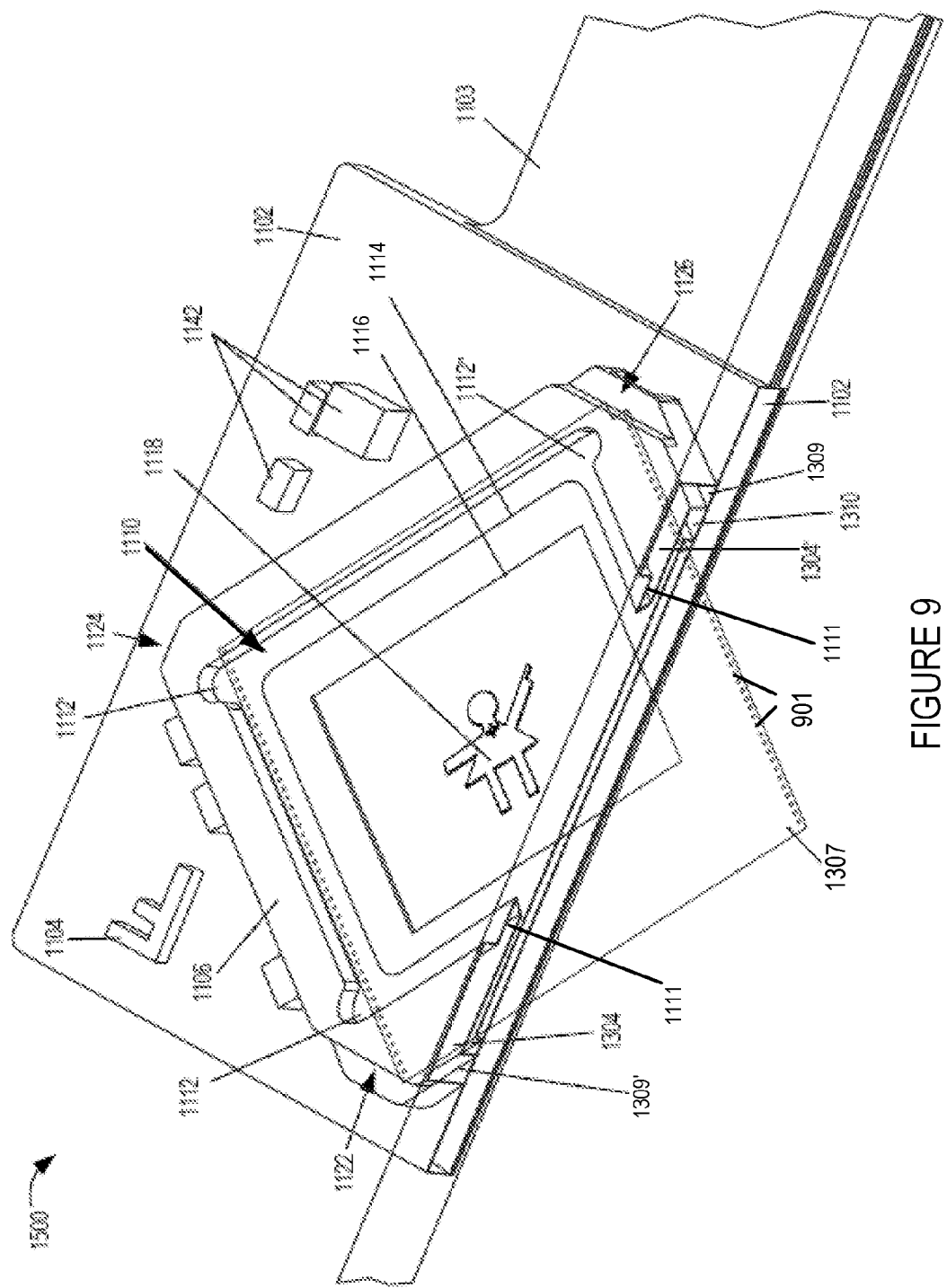
FIG. 9 shows the exemplary assembly of FIG. 5 from still another perspective and/or with a different cross sections being shown.

FIGS. 6, 7, 8, and 9 show the exemplary assembly of FIG. 5 from various perspectives and/or with different cross sections being shown and using the same reference numbers as used in FIG. 5. FIG. 6 shows a perspective 1250 while FIG. 7 shows a cross section 1300. FIG. 8 shows another cross section 1400 while FIG. 9 shows cross section 1500. FIG. 10 shows a cross section 1600 of the filter holder 1106. To avoid repetition like numbered elements are numbered the same in the various figures and the description of the elements will not be repeated with regard to each figure for purposes of brevity.

In FIG. 6, the illustrated cross-section 1300 shows a portion of the assembly shown in FIG. 5. The apparatus includes a filter mount 1106 including sidewalls 1309, 1309', 1306, 1306' forming a filter well 1110 for mounting a filter 1114. The sidewalls include outer support walls (309, 1309' extending from a top surface 1103 of a mounting board 1102 to a top 1106' of the filter well 1110. The top surface 1106' is also the top of the filter well since the top surface 1106' of the filter mount 1106 defines the top of the filter well 1110. Inner sidewalls 1306, 1306' of the filter mount 1106 extend inward from the outer support walls 1309, 1309' to form a support ledge 1111 for supporting the filter 1114 in the filter well 1110. The filter mount 1106 is positioned, e.g., secured to a top surface 1103 of said mounting board 1102. The filter mount 1106 maybe and sometimes is secured by glue, screws and/or clips. A filter 1114 is positioned in said filter well 1110 resting on the top surface of the support ledge 1111. A small gap may exist between the vertical side of the filter 114 and the vertical sidewalls of the filter well 1110 which extend from the ledge 111 up towards the top 1106' of the filter mount 1106. This gap allows for minor thermal expansion of the filter and reduces the risk of stress being placed on the sidewalls of the filter 1114 due to different thermal expansion rates of the filter 1114 and the material, e.g., plastic, out of which the filter mount 1106 is made. The filter 1114, filter mount 1106 and mounting board 1102 form a cavity 1357 in which a sensor 1307 is mounted to the mounting board 1102. Wires which are covered by the filter mount 1106 including the support ledge 1111 connect the sensor 1307 to the mounting board 1102 and/or pass through the mounting board 1102 to the flexible circuit tape 1107. The wires 901 are not visible in FIG. 6 but one wire represented by a dot on the right side of the sensor 1307 can be seen in FIG. 7 and multiple such wires 901 can be seen in FIG. 9 which shows the sensor 1307 extending out of a cut away view of the filter mount 1106.

Figure 1:
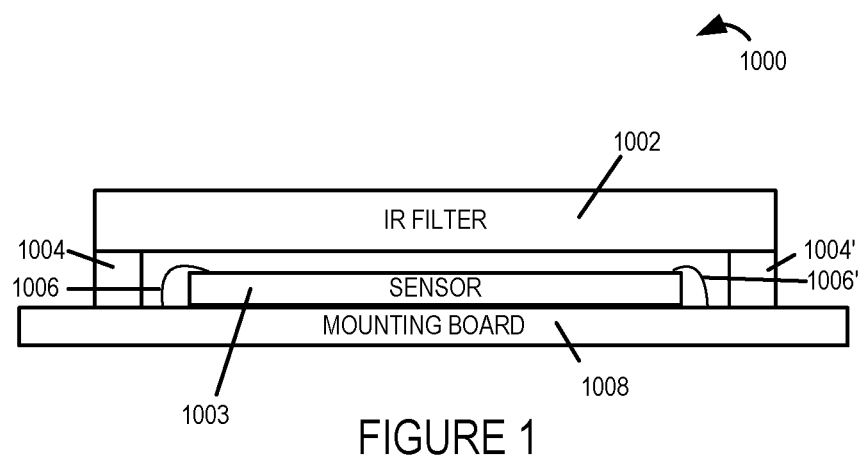
FIG. 1 illustrates a way of mounting a filter over an image sensor which suffers from various disadvantages as compared to the filter mount and mounting arrangement shown in FIG. 5.

The filter well 1110 includes rounded notched corners 1112, 1112' as can be seen in the figures including FIGS. 6 and 7. In some but not necessarily all embodiments the filter 1114 includes rounded corners and maybe in the form of a plate of filter material. The filter 1114 maybe the same or similar to the filter 1002 shown in FIG. 1 but of a size which fits in the filter well 1110.

In some embodiments the filter 1114 is secured to the filter mount 1106 in the filter well 1110 by a drop of glue placed in the corners of the filter well 1110. The notch in the corner provides not only a stress relief function but also provides an area into which excess glue may flow away from the active sensor area 1116. In some embodiments the filter 1114 is not glued at locations other then in the corners. This allows for minor movement and/or thermal expansion since the filter 1114 is not secured continuously around the entire perimeter. However, in other embodiments where vibration is of concern the glue maybe placed around the entire filter 1114 securing and sealing the filter to the filter holder 1106 in the filter well 1110. Thus in some embodiments the filter 1114 is not glued at locations other than the corner locations, e.g., is not glued in the middle along the edge which extends between corners of the filter 1114. In some embodiments the inner sidewalls 1306, 1306' of the filter mount 1106 are tapered as can be seen in FIG. 7. The taper reduces the risk of light reflections towards the active area 1116 of the sensor 1307 which might occur is vertical sidewalls were used and light was to strike the vertical sidewalls and be reflected down towards the active area 1116 of the sensor 1307. The taper is used in some but not necessarily all embodiments.

As can be seen in FIG. 7, in the case where taper inner sidewalls are used the tapered inner sidewalls 1036, 1306' extend further inward at the top than at the bottom of the sidewalls 1306, 1306'. Note that this taper in some embodiments exists in all four sidewalls forming the support ledge 1111. The longer portion of the sidewalls correspond to the top of sidewalls 1306, 1306' on which the filter 1114 is mounted and the bottom of said sidewalls corresponds to the side which extends over the sensor 1307 and which extends out less than the top portion of the support wall.

As mentioned above but as can be seen more clearly in FIG. 9, the support ledge 1111 extends over wires 901 connecting said sensor 1307 to the mounting board 1102 or a flexible electrical tape 1107.

In some embodiments the filter mount is designed to minimize reflections and to block stray light from reaching the active area of sensor 1307 or wires/other components which might reflect stray light onto the active area of the sensor 1307. To reduce reflections in some embodiments the filter mount 1106 is a dark color, e.g., black or brown. To further reduce the risk of reflections in some embodiments the filter mount 1106 includes a flat finish and is made of an opaque material, e.g., plastic, through which light is not likely to pass. Thus in some embodiments the filter mount 1106 has a matt finish and the filter mount 1106 is made of a non-reflective material. In some embodiments a top surface of the filter (1114) is recessed below a top surface of the outer support walls 1309, 1309'.

In some embodiments at least one corner, e.g., corner 1126, of said filter mount 1106 is open for ventilation of the cavity 1357. In some cases at least two corners are open allowing for cross ventilation.

While one or more corners maybe open, to reduce the risk of dirt entering the cavity 1357 one or more corners are sealed. For example corner 1128 of said filter mount 1106 is sealed. In some embodiments two corners are sealed and two corners are open allowing for a reasonable tradeoff between risk of sensor contamination and still allowing for a reasonable amount of venting. Thus in some embodiments multiple corners of the cavity 1157 are sealed.

As discussed above, stepping of corners can facilitate holding of the filter mount in an assembly jig facilitating alignment and assembly of the filter to other components such as the board 1102 and/or the assembled unit including the filter mount, filter 1114, and sensor 1307 into a camera housing. Thus in some embodiments at least one 1828 of the corners of the filter mount 1106 are stepped. The steps on different corners maybe and sometimes are different to reduce the risk of the filter mount being inserted into the assembly jig in the incorrect position.

In some embodiment the filter mount 1106, sensor 1307 and filter 1114 are combined with various other components to form a camera module. The camera module maybe used as any one of the camera modules shown in FIG. 3. Thus is should be appreciated that the sensor and filter assembly of the invention is well suited for use in camera modules such as module 1226 which does not include a mirror as well as camera modules such as camera modules 1206 and 1208 which include a mirror.

The orientation of the sensor relative to the bottom of the mounting board 1102 may and in some embodiments does vary for camera modules which include a mirror for direction light onto the sensor with the position, e.g., angle of the sensor relative to the bottom or top edge of the board 1102 depending on the final intended orientation of the camera module in which the sensor will be incorporated in the camera 100 with different modules being orientated differently relative to the bottom of the camera 100 as can be seen in FIG. 3.

Thus in some embodiments and features are directed to a camera module 1206, 1226, 1208, 1212, etc. for use in a camera device 100 where the camera module includes a filter 1114, a filter mount 1106 including sidewalls 1309, 1309', 1306, 1306' forming a filter well 1110 for mounting the filter 1114, said sidewalls including outer support walls 1309, 1309' extending from a surface 1103 of a mounting board 1102 to a top 1106' of said filter well 1110, inner sidewalls 1306, 1306' of said filter mount 1106 extending inward from the outer support walls 1309, 1309' to form a support ledge 1111 for supporting the filter 1114 in the filter well 1110 and a sensor 1307 mounted on the mounting board 1102 beneath said filter 1114. The camera modules in some embodiments include a flexible circuit tape 1107 connected to said sensor 1307 by wires 901 extending through said mounting board 1102 to said sensor 1307.

Some camera module include a round lens or cover for allowing light to ender the camera module as represented by the circles of camera modules 1206, 1208, 1226, 1202. Underneath the lens or cover plate camera modules 1206, 1208, 1202 include a light redirection device, e.g., mirror, for redirecting light through the filter 1114 and onto the sensor 1307 at the rear of the camera module which includes the light redirection device. Other modules such as module 1226 includes a lens or cover but no light redirection device and light is allowed to pass directly through the lens or cover to through the filter 1114 to reach the sensor 1307 of the camera module. Thus is should be appreciated the that filter mount 1106 and sensor arrangement can be used in a wide variety of camera modules whether or not a light redirection device is incorporated into the camera module.

FIG. 10 shows a cross section 1600 of an exemplary filter mount 1106, e.g., holder, which is the same or similar to the filter mount 1106 of the assembly shown in FIG. 5. The angled inner sidewalls 1306 and 1306' of the filter mount 1106 can be clearly seen in the FIG. 10 illustration.

The camera devices of the present invention support multiple modes of operation and switching between different modes of operation. Different modes may use different numbers of multiple lenses per area, and/or different exposure times for different optical chains used to capture a scene area in parallel. Different exposure modes and filter modes may also be supported and switched between, e.g., based on user input.

Numerous additional variations and combinations are possible while remaining within the scope of the invention.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

While described in the context of cameras, at least some of the methods and apparatus of the present invention are applicable to a wide range of image captures systems including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images maybe and sometimes are displayed on the camera device or sent to a printer for printing as a photo or permanent document which can be maintained in a file as part of a personal or business record.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain being fixed. However, in other embodiments lenses and/or other elements of an optical chain may, and sometimes do, extend beyond the face of the camera device.

In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional embodiments are possible while staying within the scope of the above discussed features.

What is claimed is:

1. An apparatus for use in a camera device, the apparatus comprising:
a filter mount (1106) including sidewalls (1309, 1309', 1306, 1306') forming a filter well (1110) for mounting a filter (1114), said sidewalls including outer support walls (1309, 1309') extending from a surface (1103) of a mounting board (1102) to a top (1106') of said filter well (1110), inner sidewalls (1306, 1306') of said filter mount (1106) extending inward from the outer support walls (1309, 1309') to form a support ledge (1111) for supporting the filter (1114) in the filter well (1110); and
the filter (1114) positioned in said filter well (1110), said filter (1114), filter mount (1106) and mounting board (1102) forming a cavity (1357) in which a sensor (1307) is mounted to said mounting board (1102), and wherein at least one corner (1126) of said filter mount (1106) is open for ventilation of the cavity (1357).

2. The apparatus of claim 1, further comprising the mounting board (1102) and wherein said filter mount (1106) is positioned on a surface (1103) of said mounting board (1102).

3. The apparatus of claim 2, wherein the inner sidewalls (1306, 1306') are tapered.

4. The apparatus of claim 2, wherein said filter mount (1106) is a dark color.

5. The apparatus of claim 2, wherein said filter mount (1106) has a matt finish.

6. The apparatus of claim 5, wherein said filter mount (1106) is made of a non-reflective material.

7. The apparatus of claim 2, wherein a top surface of said filter (1114) is recessed below a top surface of the outer support walls (1309, 1309').

8. The apparatus of claim 2, wherein at least one (1128) of the corners of the filter mount (1106) are stepped.

9. The apparatus of claim 1, wherein said filter well (1110) includes rounded notched corners (1112, 1112').

10. The apparatus of claim 9, wherein the filter (1114) includes rounded corners.

11. The apparatus of claim 9, wherein the filter (1114) is secured to the filter mount (1106) in the filter well (1110) by a drop of glue placed in the corners of the filter well (1110).

12. The apparatus of claim 11, wherein the filter (1114) is not glued at locations other than the corner locations.

13. The apparatus of claim 12, wherein the tapered inner sidewalls extend further inward at the top than at the bottom of said sidewalls (1306, 1306'), and wherein the top of said sidewalls corresponds to the side on which the filter (1114) is mounted and wherein the bottom of said sidewalls corresponds to the side which extends over the sensor (1307).

14. The apparatus of claim 13, wherein said ledge (1111) extends over wires connecting said sensor to the mounting board (1102) or a flexible tape (1107).

15. The apparatus of claim 1 wherein at least one corner (1128) of said filter mount (1106) is sealed.

16. The apparatus of claim 15, wherein multiple corners of the cavity (1357) are sealed.

17. A camera module for use in a camera device, the camera module comprising:
a filter (1114);
a filter mount (1106) including sidewalls (1309, 1309', 1306, 1306') forming a filter well (1110) for mounting the filter (1114), said sidewalls including outer support walls (1309, 1309') extending from a surface (1103) of a mounting board (1102) to a top (1106') of said filter well (1110), inner sidewalls (1306, 1306') of said filter mount (1106) extending inward from the outer support walls (1309, 1309') to form a support ledge (1111) for supporting the filter (1114) in the filter well (1110); and
a sensor (1307), mounted on said mounting board (1102) beneath said filter (1114),
and wherein the filter (1114) is positioned in said filter well (1110), said filter (1114), filter mount (1106) and mounting board (1102) forming a cavity (1357) in which said sensor (1307) is mounted to said mounting board (1102), and wherein at least one corner (1126) of said filter mount (1106) is open for ventilation of the cavity (1357).

18. The camera module of claim 17, further comprising:
a flexible circuit tape (1107) connected to said sensor (1307) by wires (901) extending through said mounting board (1102) to said sensor (1307).

* * * * *